(12) United States Patent
Minh

(10) Patent No.: US 6,270,536 B1
(45) Date of Patent: Aug. 7, 2001

(54) METHOD OF FABRICATING SOLID OXIDE FUEL CELL ELECTRODES

(75) Inventor: Nguyen Q. Minh, Fountain Valley, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/256,485

(22) Filed: Feb. 23, 1999

Related U.S. Application Data

(60) Provisional application No. 60/084,840, filed on May 8, 1998.

(51) Int. Cl.[7] ................................................ H01M 6/00
(52) U.S. Cl. .......................... 29/623.3; 429/30; 429/27; 429/127; 156/87
(58) Field of Search .................... 429/30, 32, 33, 429/13, 27, 34, 127; 29/623.1, 623.3, 623.4, 623.5; 156/87, 90; 264/61

(56) References Cited

U.S. PATENT DOCUMENTS

| | | | |
|---|---|---|---|
| 4,883,497 | * 11/1989 | Kaun | 29/623.5 |
| 5,219,673 | * 6/1993 | Kaun | 429/32 |
| 5,273,837 | * 12/1993 | Aitken et al. | 429/30 |
| 5,286,322 | * 2/1994 | Armstrong et al. | 156/89 |
| 5,509,189 | * 4/1996 | Tuller et al. | 29/623.1 |
| 5,993,986 | * 11/1999 | Wallin et al. | 429/32 |
| 5,993,988 | * 11/1999 | Ohara et al. | 429/40 |

* cited by examiner

Primary Examiner—John S. Maples
Assistant Examiner—R Alejandro
(74) Attorney, Agent, or Firm—William J. Zak, Jr. Esq.

(57) ABSTRACT

A method of fabricating solid oxide fuel cell electrodes, and in particular anodes, includes the steps of forming a microcomposite element comprising a plurality of layers of an electrically conductive tape and an electrolyte tape, with the plurality of layers forming a first electrically conductive pattern. A plurality of microcomposite subelements are created from the microcomposite element, with each microcomposite subelement having the first electrically conductive pattern. A plurality of the microcomposite subelements are juxtaposed to one another and also rotated in planes substantially parallel to one another. Thereby, a totality of the first electrically conductive patterns form a second electrically conductive pattern in the anode. Electrical conduction is established with the patterns all being in electrical contact with one another.

12 Claims, 1 Drawing Sheet

METHOD OF FABRICATING SOLID OXIDE FUEL CELL ELECTRODES

CROSS-REFERENCE TO RELATED APPLICATIONS

The present application claims the benefit of U.S. Provisional Application No. 60/084,840, filed May 8, 1998.

BACKGROUND OF THE INVENTION

The present invention generally relates to solid oxide fuel cells and, more particularly, to a method of fabricating a solid oxide fuel cell electrode with engineered structures to improve performance characteristics.

A fuel cell is basically a galvanic conversion device that electrochemically reacts a fuel with an oxidant within catalytic confines to generate a direct current. A fuel cell typically includes a cathode material which defines a passageway for the oxidant and an anode material which defines a passageway for the fuel. An electrolyte is sandwiched between and separates the cathode and anode materials. An individual electrochemical cell usually generates a relatively small voltage. Thus, to achieve higher voltages that are practically useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

The fuel and oxidant fluids are typically gases and are continuously passed through separate cell passageways. Electrochemical conversion occurs at or near the three-phase boundary of the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that diffuse through the electrolyte to the anode. The electrons flow from the anode through an external circuit and then to the cathode, with the circuit being closed internally by the transport of oxide ions through the electrolyte.

In a SOFC, the electrolyte is in solid form. Typically, the electrolyte is made of a nonmetallic ceramic, such as dense yttria-stabilized zirconia (YSZ) ceramic, that is a nonconductor of electrons, which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the anode oftentimes being made of nickel/YSZ cermet and the cathode oftentimes being made of doped lanthanum manganite. In the solid oxide fuel cell, hydrogen or a hydrocarbon is commonly used as the fuel and oxygen or air is used as the oxidant.

Various methods have been employed for making the four materials of a fuel cell, such as that shown in U.S. Pat. No. 4,476,198. Therein, the compositions used for the four materials are put into four distinct slurries. Each slurry is then placed in a reservoir of a squeegee-type device which is pulled over a flat surface and hardens or plasticizes into a layer of the material having the desired thickness. In this manner, an electrolyte wall or interconnect wall is formed by a first layer of anode material followed by a layer of either electrolyte or interconnect material and finally by a layer of the cathode material. The layers are capable of being bonded together since the binder system is the same in each layer.

U.S. Pat. No. 4,816,036 shows the compositions of the four materials being individually mixed with a binder and a plasticizer to form a plastic mix, and each then being processed by hot-rolling into a tape form. The tapes are combined in a trilayer form as trilayer electrolyte walls and trilayer interconnect walls. The walls are then assembled, stacked, and sintered to form a monolithic solid oxide fuel cell.

Another example of forming a monolithic solid oxide fuel cell is U.S. Pat. No. 5,162,167. Ceramic powders for each of the four materials are provided. The powders are mixed with a desired binder and plasticizer in a high intensity mixer. The mixed materials are formed into respective tapes by a roll mill. The individual tapes are then used to form green state multilayer tapes comprising an anode-electrolyte-cathode or an anode-interconnect-cathode. The green state multilayer tapes can then be cut and molded into desired net shape elements which can be assembled into pairs. After the paired elements are densified, they are stacked and bonded with a bonding material. The stacked elements are then sintered to provide a monolithic assembly. A method similar to the above is shown in U.S. Pat. No. 5,256,499.

As seen in U.S. Pat. Nos. 5,286,322; 5,256,499; and 5,162,167, the ceramic powder often used in making the anode comprises a mixture of yttria-stabilized zirconia and nickel oxide. It is known that the addition of zirconia reduces the thermal expansion of the anode that otherwise occurs during operation of the fuel cell, with temperatures frequently being in the range of 700 to 1,000 degrees C. Unless controlled by a component such as zirconia, the thermal expansion and contraction of the anode produce thermal stresses that can lead to failure of the anode and components associated with it.

On the other hand, it is known that the mixing of zirconia with nickel oxide tends to create a random positioning of the nickel atoms, which leaves a less than optimum condition for electrical connectivity. The less than optimum condition is created because the random mixing of the components tends to cause the nickel atoms to migrate towards one another at high operating temperatures and thereby create voids in the already random arrangement of nickel atoms. These voids tend to reduce the electron flow in the anode and, accordingly, reduce the effectiveness of the fuel cell. To compensate for the reduced effectiveness of the nickel, the concentration of the nickel can be increased. But then the thermal expansion of the anode increases, resulting in increased thermal stresses. Also, the overall cost of the fuel cell may increase.

Yet another disadvantage of random mixing of the zirconia and nickel oxide is the limited control over thermal expansion of the anode. With random mixing, the concentration of the nickel must typically be at least 30 volume percent to provide sufficient conductivity to the anode. This required concentration sets the low limit of thermal expansion that can be controlled for the anode. The random mixing in the prior art also limits control in terms of the fuel uptake or access by the anode. Since fuel access is being governed by a random placement of nickel throughout the anode, the degree of fuel access in any one point in the anode is essentially a random circumstance.

As can be seen, there is a need for an improved method of making a SOFC. There is also a need for an improved electrode and, particularly, an anode, as well as method of making the same for a SOFC. A need exists for an improved anode and method of making the same which minimizes thermal expansion while maximizes electrical connectivity. In particular, there is a need for an anode and method of making the same which minimizes the randomness of the anode components to maximize the electrical connectivity. Also needed is an improved anode and method of making the same which provides the ability to tailor thermal expansion and fuel access.

SUMMARY OF THE INVENTION

A method of fabricating a solid oxide fuel cell electrode, and in particular an anode, comprises the steps of forming a microcomposite element comprising a layered pattern of an electrical conducting tape; creating a plurality of microcomposite subelements from the microcomposite element, each microcomposite subelement having the layered pattern; and juxtaposing at least two of the microcomposite subelements such that the layered patterns of adjacent microcomposite subelements are in differing orientations to one another.

An anode for a solid oxide fuel cell comprises a first layer of an electrical conducting component formed in a first electrical conducting pattern; and a second layer of the electrical conducting component formed in a second electrical conducting pattern, with the first and second electrical conducting patterns being in electrical contact with each other.

These and other features, aspects and advantages of the present invention will become better understood with reference to the following drawings, description and claims.

DETAILED DESCRIPTION OF THE INVENTION

Figure 1:
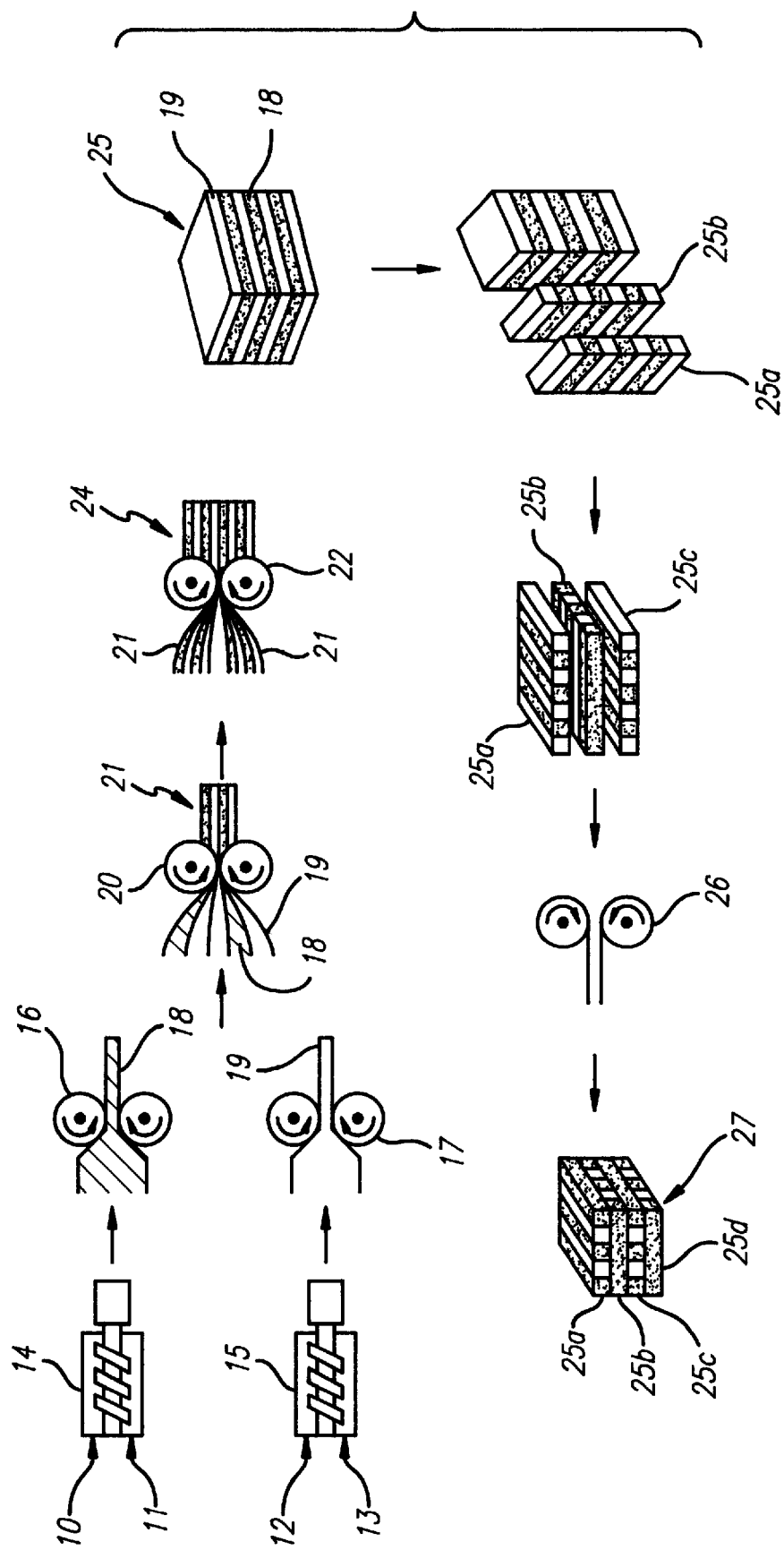
FIG. 1 is a schematic diagram of one embodiment of a process for making an electrode in a solid oxide fuel cell according to the present invention.

FIG. 1 schematically depicts a tape calendering process for making an electrode in a solid oxide fuel cell according to one embodiment of the present invention. Although the process of the present invention can be used to make electrodes in general, the process is particularly useful for making anodes. Accordingly, FIG. 1 also depicts one embodiment of an anode 27 made according to the process of the present invention. For making the anode 27, the process of the present invention generally includes the steps of forming an electrically conductive tape 18 from an electrically conductive component 10, as well as forming an electrolyte tape 19 from an electrolyte component 12. The tapes 18,19 are then rolled together to form a multilayer composite tape 21. A plurality of multilayer composite tapes 21 are rolled together into a layered microcomposite tape 24. The layered microcomposite tape 24 can then be cut into net shape pieces and stacked into a microcomposite element 25 having a pattern described by the electrical conducting tape 18. The microcomposite element 25 is cut into microcomposite subelements 25*a,b,c* and then juxtaposed to one another such that the pattern of electrical conducting tape 18 in adjacent subelements 25*a,b,c* are of differing orientations but still in electrical contact with one another.

In more particularly describing the embodiment of the present invention shown in FIG. 1, the electrically conductive component 10 that comprises the electrically conductive tape 18 can be a ceramic powder. As practiced in the art, the electrically conductive component 10 can include various conducting elements, such as platinum, cobalt or nickel. In this particular embodiment, nickel in the form of an oxide is used. However, the electrically conductive component 10 can be a mixture of several conducting materials.

But unlike what has been commonly practiced in the prior art, the ceramic powder or electrically conductive component 10 is not initially combined or mixed with an electrolyte component such as yttria-stabilized zirconia (YSZ). Instead, if an electrolyte component is initially mixed at all with the electrically conductive component 10, the electrolyte is in an insubstantial amount, such as less than about 5 vol %. For example, a small amount of an electrolyte component may be initially added to the electrically conductive component 10 to reduce thermal expansion of the anode 27. Yet, the amount of added electrolyte should be minimized since a significant amount of electrolyte can lead to the reduced electrical conductivity the present invention seeks to overcome. Accordingly, the subsequently formed electrically conductive tape 18 is substantially devoid of an electrolyte component.

What is mixed with the ceramic powder 10 at this point in the process is a binder/plasticizer 11, which is similar to that practiced in the art. The binder is for the purpose of binding the metal elements together, while the plasticizer is for the purpose of providing a plasticity consistency suitable for tape formation. The particular binder used, as is known in the art, can vary and include, for example, synthetic rubber, polyvinyl alcohol or polymer systems which thermally decompose without crosslinking. Similarly, the plasticizer can vary but is generally a pliable, elastic material that allows low temperature forming of a binder system. Useful plasticizers include butyl benzyl phthalate and solvents of the phthalate group. The combined concentration of the binder and plasticizer may range from about 10 to 40 wt %, as further described, for example, in U.S. Pat. No. 5,290,642. Mixing of the above three components can occur in a high intensity mixer 14 to provide a conducting mixture.

As with the electrically conductive component 10, the electrolyte component 12 is also in the form of a ceramic powder and substantially devoid of the electrically conductive component 10. The particular electrolyte component 12 used can vary and include oxide ion conducting materials, such as ceria, bismuth oxide and lanthanum gallate. In this embodiment, yttria-stablized zirconia is used because of its known characteristics. The electrolyte component 12 is also mixed with a binder/plasticizer 13 which preferably includes the same components used in the binder/plasticizer 11. Thereby, the subsequently formed tapes 18,19 can more readily combine with one another, as further described below. A high intensity mixer 15 can be used to mix the electrolyte component 12 and the binder/plasticizer 13 to provide an electrolyte mixture.

The conducting mixture and electrolyte mixture are then passed through respective two-roll mills 16,17. In turn, the mills 16,17 form the electrically conductive tape 18 and electrolyte tape 19, respectively. The thickness of the tapes 18,19 can be varied to match the particular environment and operating requirements of the anode 27. Typical thicknesses range from about 5 to 75 mils. Next, the tapes 18,19 are brought together, passed through a two-roll mill 20 and frictionally bonded together. Although the embodiment shown in FIG. 1 discloses only two conductive tapes 18 being combined with two electrolyte tapes 19, the present invention contemplates that one or more conductive tapes 18 can be combined with one or more electrolyte tapes 19. Irrespective of the number of tapes 18,19 processed by the mill 20, the green state, multilayer composite tape 21 is formed therefrom.

As can be appreciated, the multilayer composite tape 21 has an electrically conductive pattern. In this embodiment of the invention, the conductive pattern comprises alternating layers of a single conductive tape 18 and a single electrolyte tape 19. Yet, it is within the contemplation of the invention that the multilayer composite tape 21 can comprise other conductive patterns by combining a single or multiple layers of tapes 18 with a single or multiple layers of tapes 19, as mentioned above. For example, single and/or multiple tapes 18, 19 may be used for tailoring the thermal expansion of the anode 27 or for tailoring the fuel access through the anode 27. To reduce thermal expansion, and if the tapes 18, 19 are of substantially the same thickness, a greater number of electrolyte tape 19 layers than conductive tape 18 layers may be used. For greater fuel access, more layers of conductive tape 18 to electrolyte tape 19 may be used.

Moreover, each layer of conductive tape 18 or electrolyte tape 19 may comprise multiple sublayers (not shown). Multiple sublayers may be of use, for example, where there is a concern over the conductive tape 18 adhering to the electrolyte tape 19 or the electrolyte tape 19 reacting with the conductive tape 18. As an example, three sublayers may be used for a single layer of conductive tape 18. With an adherence problem, the middle sublayer might not adhere to the electrolyte tape 19 and is therefore sandwiched between two sublayers which can adhere to the electrolyte tape 19. In a reaction situation, the middle sublayer may need to be protected and is therefore sandwiched between two protective sublayers.

Irrespective of the use of sublayers, after the multilayer composite tape 21 is formed in the desired layers, a plurality of tapes 21 are combined, passed through a two-roll mill 22, and frictionally bonded together. From the mill 22, a layered microcomposite tape 24 is formed and has, in this embodiment, the same conductive, layered pattern of tapes 18, 19 which was in the multilayer composite tape 21. Still, it should be understood that one may use a plurality of different tapes 21 to form a tape 24 which has a conductive pattern different from what is in a single tape 21. Thus, for example, if one desired to tailor the thermal expansion or fuel access, different tapes 21 having different conductive patterns might be used. In such instance, multicomposite tapes 21 (having layered patterns of electrically conductive tape 18 and electrolyte tape 19) may be of different thicknesses.

The layered microcomposite tape 24 may be then be cut into a desired net shape to provide a microcomposite element 25. If it is desirable to increase the overall thickness of the microcomposite element 25, a plurality of the layered microcomposite tapes 24 can be cut, stacked and bonded together such as by a wetting solution like isopropyl alcohol or by other methods such as hot pressing. As seen in FIG. 1, the conductive pattern of alternating layers of conductive tape 18 and electrolyte tape 19 is present in the microcomposite element 25, as it was in the layered microcomposite tape 24. It is also shown in FIG. 1 that the layers of tapes 18,19 in the microcomposite element 25 are of substantially the same thickness. However, it is contemplated that the thickness can be varied, for example, in order to reduce the internal resistance of the SOFC. In such instance, the thickness of the electrolyte tape 19 is desirably less than that of the conductive tape 18.

Next, the microcomposite element 25 is cut into a plurality of microcomposite subelements 25a,b,c,d. Of course, the number of subelements can vary in order to increase the overall thickness of the anode 27 or to provide more active areas for fuel reaction. Similarly, even though the subelements 25a,b,c,d are shown in FIG. 1 with substantially the same thicknesses, the thicknesses can be varied, for example, to improve the mechanical property of the anode 27. Such improvement can be achieved by making, for example, the subelement 25b thicker than the subelements 25a, c and making layered patterns of tapes 18, 19 different. Notwithstanding the number or thicknesses of the subelements 25a,b,c,d, it can be appreciated that each of the subelements 25a,b,c,d continue to have the same conductive pattern of alternating layers of conductive tape 18 and electrolyte tape 19 as in the element 25.

After the subelements 25a,b,c,d have been cut, they are juxtaposed to one another and rotated in planes substantially parallel to one another. The juxtaposition is such that one subelement has a conductive pattern in a first orientation. At the same time, subelements immediately adjacent to the one subelement have a second conductive pattern which can be substantially the same as or substantially different from the first conductive pattern. In the embodiment shown in FIG. 1, the first and second patterns are substantially the same. If, however, it was desirable to increase mechanical strength or improve fuel diffusion, then the first and second patterns could be different. With the first and second conductive patterns being substantially the same for this embodiment, subelements 25a,b,c are juxtaposed to one another in substantially parallel planes. Further, and as seen in FIG. 1, subelement 25a is rotated about 90 degrees such that its conductive pattern is oriented about 90 degrees to the pattern in subelement 25b. At the same time, subelement 25c is rotated about 90 degrees with respect to subelement 25b such that their respective conductive patterns are oriented about 90 degrees to one another. Although a 90-degree orientation is shown for this embodiment of the invention, other orientations can be used in practicing the present invention. As an example, a 30-degree orientation may be used to achieve more active area for the electrochemical reaction.

With the subelements juxtaposed and their conductive patterns oriented as desired, the subelements can then be bonded together by passing them through a two roll mill 26 to form the anode 27. Other forming methods, however, can be used such as pressing. As seen in FIG. 1, the subelements 25a,c have their conductive patterns in one orientation while subelements 25b,d have a different conductive pattern due to their being in another orientation when compared to subelements 25a,c. On an overall basis, the differing orientations and integrated layering of the subelements 25a,b,c,d, provide an electrically conductive pattern for the anode 27, which is different from the conductive pattern of a single subelement.

It can be appreciated that the overall conductive pattern of the anode 27 allows the conductive tapes 18 which comprise the subelements 25a,b,c,d to remain in electrical contact with one another. In other words, areas of conductive tape 18 (i.e., active areas) in adjacent subelements are in contact. At the same time, a more structured network of an electrically conductive component 10 and electrolyte component 12 is provided in each subelement 25a,b,c,d when compared to the random network or mixing in the prior art which occurs from actually mixing the components 10,12 prior to forming tapes.

In particular, the structured network of the present invention comprises defined areas of conductive component 10 and defined areas of electrolyte component 12 in the subelements 25a,b,c,d. These defined areas, in essence, comprise the conductive tapes 18 and electrolyte tapes 19 which have been bonded together. Because the tapes 18, 19 were initially formed with a conductive component or an electrolyte component, but substantially not both, the defined areas for the conductive component are substantially devoid of and physically separate from the electrolyte component and its respective defined areas. Thereby, electrical conduction is more readily controlled.

The conductive network of the present invention can also strengthen the overall structure of the anode 27, while preventing dimensional changes that might otherwise occur during anode reduction. Greater strength is achieved by virtue of the electrolyte network within the anode 27 structure. Another advantage of the present invention is the ability to tailor the thermal expansion of the anode 27. This can be done by varying the thickness ratio of the conductive tape 18 to the electrolyte tape 19.

It should be understood, of course, that the foregoing relates to preferred embodiments of the invention and that modifications may be made without departing from the spirit and scope of the invention as set forth in the following claims.

We claim:

1. A method of making an anode or cathode electrode for a fuel cell, comprising the steps of:

forming an element comprising a first electrically conductive pattern of an electrolyte tape and an electrically conductive tape;

said electrically conductive tape includes an electrolyte component from 0 vol. % to not more than 5 vol. % and a conductive component;

creating a plurality of subelements from said element, each subelement having said first electrically conductive pattern of electrolyte tape and electrically conductive tape; and juxtaposing at least two of said subelements such that subelements are in a non-parallel angle to one another in parallel planes while the subelements remain in electrical contact with one another to form in said electrode a second electrically conductive pattern of electrolyte tape and electrically conducting tape that is different than said first electrically conductive pattern.

2. The method of claim 1, further comprising the step of bonding said electrically conductive tape with said electrolyte tape.

3. The method of claim 2, wherein said electrolyte tape is devoid of said conductive component.

4. The method of claim 1, further comprising the step of placing in electrical contact with one another said subelements.

5. A method of making an anode electrode for a solid oxide fuel cell, comprising the steps of:

forming an element comprising a first electrically conductive pattern of an electrolyte tape and electrically conducting tape;

said electrically conductive tape includes said electrolyte component from 0 vol. % to not more than 5 vol. % and a conductive component;

creating a plurality of subelements from said element, each subelement having a structured network of defined areas of said electrolyte component physically separated from defined areas of conductive component that provides said first electrically conductive pattern; and juxtaposing said subelements to form said anode electrode, the step of juxtaposing comprising the step of orienting in a non-parallel angle said subelements to one another in parallel planes and placing in electrical contact said first electrically conductive patterns of adjacent subelements such that a second electrically conductive pattern of electrolyte tape and electrically conducting tape that is different from said first electrically conductive pattern is formed in said electrode.

6. The method of claim 5, further comprising the step of rotating said subelements relative to one another.

7. The method of claim 5, further comprising the step of forming in said anode electrode a second electrically conductive pattern.

8. The method of claim 5, further comprising the step of forming a multilayer composite tape and then a layered tape to form said element.

9. A method of making an anode electrode for a solid oxide fuel cell, comprising the steps of:

forming an element comprising a plurality of layers of an electrically conductive tape of anode material devoid of an electrolyte component and an electrolyte tape, said plurality of layers forming a first electrically conductive pattern;

creating a plurality of subelements from said element, each subelement having a structured network of defined active areas of said electrolyte component physically separated from defined active areas of a conductive component in said electrically conductive tape that provides said first electrically conductive pattern;

juxtaposing a plurality of said subelements; and rotating in planes substantially parallel to one another a plurality of said subelements such that a totality of said first electrically conductive patterns form a second electrically conductive pattern of said electrically conductive tape in said anode wherein said first and second electrically conductive patterns are different from one another.

10. The method of claim 9, wherein said electrolyte tape is substantially devoid of an electrically conductive component.

11. The method of claim 9, further comprising the step of combining said electrically conductive tape and said electrolyte tape to form a multilayer composite tape and a layered tape prior to the step of forming an element.

12. The method of claim 9, further comprising the step of placing in electrical contact said subelements.

* * * * *